Oct. 15, 1957     K. H. HACHMUTH     2,809,710
METHOD AND APPARATUS FOR THE REMOVAL OF ACETYLENE
FROM GASES CONTAINING ETHYLENE
Filed Oct. 16, 1953
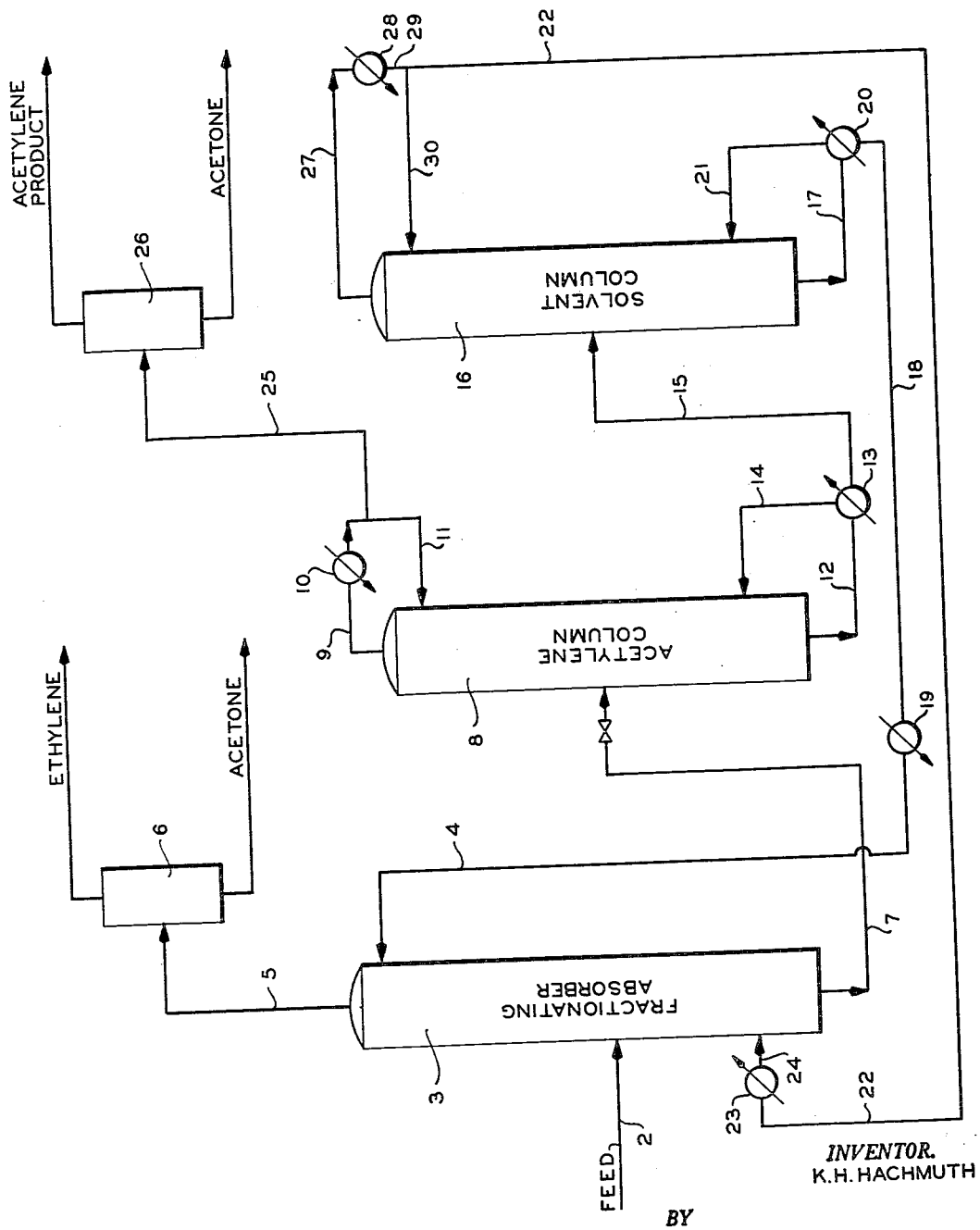
*INVENTOR.*
K. H. HACHMUTH
BY
*Hudson and Young*
ATTORNEYS 2,809,710
Patented Oct. 15, 1957

2,809,710

METHOD AND APPARATUS FOR THE REMOVAL OF ACETYLENE FROM GASES CONTAINING ETHYLENE

Karl H. Hachmuth, Bartlesville, Okla., assignor to Phillips Petroleum Company, a corporation of Delaware Application October 16, 1953, Serial No. 386,586

17 Claims. (Cl. 183—2)

The present invention relates to a method, and an apparatus in which said method can be practiced, for the removal of acetylene from a hydrocarbon gas mixture also containing ethylene, for example, a mixture of acetylene, ethylene and ethane. In the absorption of acetylene in acetone, one of the problems which is encountered is the possible formation of polymers and other undesirable materials. Thus, a process in which the acetone, or other solvent for acetylene, need not be heated to temperatures heretofore employed, is highly desirable.

I have now found that employing a third component in the process in which acetylene is absorbed into acetone, as described herein, results in a temperature which can be as much as 20 degrees Fahrenheit lower than that heretofore necessary, i. e., about 160° F. in the kettle of the absorber at about 50 p. s. i. g. Not only is the temperature lowered but also the third component acts to provide a diluent effect which further prevents undesirable reactions of the solvent or acetone with itself, impurities which can be present, or even with the acetylene, it being known that acetone and acetylene can copolymerize with each other.

According to the invention, acetylene can be purified employing a lower temperature than has been employable heretofore and heat can be supplied to a reboiled absorber, in which acetylene is absorbed in, say, acetone, by feeding to said absorber a heated solution not containing any acetylene.

Thus, according to the method of the present invention, an acetylene containing gas is supplied to an absorber zone in a section of which it is contacted with a solvent, for example, acetone, which absorbs acetylene and unavoidably some of the other gases present, for example, ethylene and some ethane; the rich solvent is then contacted in a different section with a mixture of the solvent, here acetone, and a substance, liquid under the operating conditions, but when introduced to said section preferably at least partly vaporized, having a boiling temperature which is preferably intermediate that of the solvent and the acetylene, or being such that it forms an azeotrope in the last-mentioned section, for example, with the selective solvent, which azeotrope preferably boils intermediate the boiling temperatures of the solvent and the acetylene, said mixture being at a temperature sufficient to cause any absorbed ethylene and ethane to be stripped from the acetone-acetylene mixture; following which the acetylene, acetone and said substance are removed from said second mentioned section and the acetylene recovered therefrom. The method provides for re-use of the solvent and said substance.

Thus, according to this invention, acetylene is separated from a mixture of hydrocarbons, such as would be obtained from thermal decomposition or partial oxidation processes, by a modified absorption process in which a third component, i. e., in addition to the solvent and the acetylene, with a boiling point intermediate that of acetylene and the solvent, is added to the process to lower the temperatures required in the kettles of a reboiled absorber and a stripper. The third component and the solvent are then separated and the third component is heated, partially or completely vaporized and returned to the absorber kettle where it furnishes reboiler heat in direct contact with the reboiler liquid.

It is preferred to have the solvent and third component form a minimum boiling azeotrope but this is not necessary. If an azeotrope is formed, the third component stream will contain appreciable quantities of the solvent; if an azeotrope is not formed, essentially complete separation may be accomplished, or if preferred the separator may be operated so that either stream is relatively pure and the other stream will contain appreciable quantities of the first component.

The attached drawing is a schematic diagram of a purification process employing my invention using acetone as the solvent and pentane as the third component.

A $C_2$ gas stream containing acetylene, ethylene and some ethane or a depropanized cracking effluent, containing hydrogen and methane, as well as $C_2$'s, is fed via line 2 to a fractionating absorber 3. This stream, in the embodiment described, will ordinarily be at a temperature in the approximate range of 50–90° F. The upper, or absorption, section is operated at such a pressure and temperature as dictated by process and economic conditions. Preferred conditions are now considered to be 60–80° F. and 40–60 p. s. i. g. Cold acetone is fed to the top of absorber 3 by way of line 4. Essentially all of the acetylene along with some ethylene and a small amount of ethane is absorbed in the cold acetone flowing down the column. The off-gas, now enriched in ethylene and containing a small amount of acetone vapor, is taken overhead through line 5 and processed, in vessel 6, to remove the acetone by any conventional method.

The rich acetone, containing essentially all of the acetylene, flows downwardly into a higher temperature fractionating section wherein an upward flow of gases resulting from the introduction of heated pentane-acetone mixture strips from the acetone the ethylene and ethane, along with some recycle acetylene. The acetone reaching the bottom of the column is essentially free of dissolved ethylene and ethane. Conditions at the bottom of absorber 3 now preferred are: 140–170° F. It will be obvious to one skilled in the art in possession of this disclosure that the stripping which takes place at the foot of fractionating absorber 3 takes place substantially at the same pressure at which the gases are absorbed in the said absorber. From the bottom of the absorber, the acetylene-acetone and pentane mixture is passed via line 7 to acetylene recovery column 8, the top of which is maintained in the approximate range of 70–90° F., wherein acetylene is recovered from the said mixture and passed via line 9, partial condenser 10, in which the temperature of the acetylene at the operating pressure can be as low as the dewpoint, which can be accomplished with refrigeration, and line 25 to vessel 26 in which the traces of acetone are removed from the acetlyene product in any desired manner. The condenser 10 can be replaced with a series of coolers and condensers, with intermediate product removed and/or an intercooler can be employed at the top of the acetylene column. The first cooler would be supplied with water as a coolant and reduce temperatures to the range of 70 to 120° F.; the second cooler and condenser would be supplied with the refrigerant as the coolant and would reduce the temperature to whatever level is found optimum. The gas in line 25 is a high purity acetylene in the sense that no undesirable hydrocarbon is contained therein. Should the process used in vessel 26 not remove all the pentane, or other hydrocarbon used in place of pentane, and should more complete removal of the hydrocarbon be necessary, activated charcoal, oil absorption or a low temperature dephlegmator may be used to reduce the concentration of said hydrocarbon to any degree desired. The condensed overhead is returned as reflux to the column via line 11. The pressure in the column should be as high as can be used safely on pure acetylene for best results. However, in view of safety considerations, it is now believed inadvisable to exceed about fifteen pounds per square inch gauge. Bottoms from acetylene column 8 are withdrawn through line 12 to reboiler 13, and portion vaporized in reboiler 13 is returned through line 14. The unvaporized portion is withdrawn as bottoms and passed, in production quantities, via line 15 to solvent column 16 in which conditions are maintained to obtain substantially pure acetone which are returned to absorber 3 as bottoms via lines 17, 18, cooler 19, and line 4. Conditions now preferred for column 16 are: top temperature of 100–120° F., bottom temperature 135–155° F. and 0–10 p. s. i. g. Heat is supplied to the column by passing some of the bottoms from line 17 through reboiler 20 and line 21 back to the column. Overhead vapors from column 16, removed therefrom via line 27, consists substantially of pentane and acetone, pentane predominating the mixture. This mixture is passed through condenser 28, line 29, and a part of it is returned to the column as reflux through line 30. Overhead product is passed via line 22, heater 23 and line 24 to the bottom of absorber 3, thus supplying the heat and stripping medium, according to the present invention. Instead of the total condenser 28, a partial condenser may be used and thus return the material to bottom of the absorber 3 as a vapor.

It will be evident to one skilled in the art in possession of this disclosure that other compounds can be employed instead of pentane. Thus, pentane is cited merely as an example for the purpose of this description and other substances boiling in the required range, preferably saturated hydrocarbons such as butane and hexane can be used. Saturated hydrocarbons are preferred because the small amount of these compounds that may get into the product acetylene will not likely interefere with the subsequent use of the acetylene. Olefins and certain other compounds can be employed in lieu of, or together with, the pentane. The following table lists some of such compounds. It will be evident to one skilled in the art in possession of this disclosure that the invention provides, among other aspects, a modus operandi and that when it is so viewed the exact nature of the third or other component of the streams in the absorber is not limiting.

TABLE I

Azeotropes of acetone [1]

| Formula | Compound | B. P. of Compound | Azeotrope | |
|---|---|---|---|---|
| | | | B. P., ° C. | Wt. Percent Acetone |
| $C_3H_7Cl$ | 1-Chloropropane | 46.65 | <46.0 | <20 |
| $C_4H_9Cl$ | 2-Chloro-2-Methyl-propane | 50.8 | <49.5 | <28 |
| $C_5H_{10}$ | 1-Pentene | 30.1 | Minimum Boiling Azeotrope. | |
| $C_5H_{10}$ | 2-Pentene | 36.4 | do | |
| $C_5H_{12}$ | 2-Methylbutane | 27.95 | 26 | 20 |
| $C_5H_{12}$ | N-Pentane | 36.2 | 32 | [2] 20 |
| $C_6H_{14}$ | N-Hexane | 68.95 | 49.8 | 59 |
| $C_6H_{12}$ | Cyclohexane | 80.75 | 54.0 | 85 |
| $C_4H_9Cl$ | 1-Chloro-2-Methylpropane | 68.9 | 55.8 | 73 |

[1] Horsley, Industrial and Engineering Chemistry, August 1947, pages 508–600.
[2] Reported by Lecat 1936.

The conditions above-mentioned are primarily related to acetone as the solvent or absorbent in the modus operandi of the invention and, therefore, adjustment of conditions to other solvents may be necessary and can be accomplished by mere test. Also, with other solvents certain modifications may be desirable but these, too, will be apparent to said one skilled in the art. For example, other solvents such as methyl ethyl ketone, methyl acetate, and ethyl acetate can be employed. The following table lists compounds which can be employed when the solvent is ethyl acetate.

TABLE II

Azeotropes of ethyl acetate (B. P. 77.15) [1]

| Formula | Compound | B. P. of Compound | Azeotrope | |
|---|---|---|---|---|
| | | | B. P., ° C. | Wt. Percent Ethyl Acetate |
| $C_4H_9Br$ | 2-Bromo-2-Methyl-propane | 73.5 | 71.5 | 30 |
| $C_4H_9Cl$ | 1-Chlorobutane | 78.05 | 76.0 | 35 |
| $C_6H_{10}$ | Cyclohexene | 82.75 | 75.5 | 85 |
| $C_6H_{12}$ | Cyclohexane | 80.75 | 72.5 | 54 |
| $C_6H_{14}$ | n-Hexane | 68.96 | 65.0 | 42 |

[1] Horsley, Industrial and Engineering Chemistry, August 1947, page 547.

In the operation described, in the place of pentane, narrow boiling range refinery streams containing, for example, olefins, normal- and iso-paraffins, cyclopentane can be employed. The boiling range should be, preferably, not in excess of about 50° F. with the range as low as commercially feasible. If the substance used forms an azeotrope with the solvent it is desirable that the percentage of solvent in the azeotrope be low. The lower the ratio of solvent to third component in the absorber, the lower the kettle temperature will be.

Also, in the operation described, the temperatures at the top of the towers will ordinarily be maintained employing cooling water. However, lower temperatures and the use of refrigeration are within the scope of the appended claims.

The acetone column should be operated at essentially atmospheric pressure or below, in order to maintain a low temperature in the kettle. Reduced pressures are also within the scope of the claims, in respect of the operation of this column.

It will be noted in the above description that according to the invention, a preponderant proportion of the acetone is not vaporized and further that the third component, pentane in the example, is maintained in a closed circuit and can be re-used indefinitely.

While this invention has been described as it is particularly and advantageously applied to the removal of acetylene from a hydrocarbon gas mixture, it will be evident to one skilled in the art in possession of this disclosure that the invention applies equally well to the separation of gases other than acetylene from hydrocarbons or from other gases.

Reasonable variation and modification are possible within the scope of the foregoing disclosure and the appended claims to the invention, the essence of which is that there have been provided a method and an apparatus with which to separate a substantially pure acetylene from a gas containing the same employing in addition to the solvent, for example, acetone, a material boiling intermediate that of acetylene and said solvent or a material forming an azeotrope in the kettle of the apparatus, for example, with the solvent there present, said azeotrope boiling intermediate the boiling temperatures of the solvent and acetylene whereby to obtain lower kettle temperatures and a dilution of the acetylene and solvent in the said kettle which is employed to reboil the absorber products to strip therefrom hydrocarbons which are undesirable in the acetylene, for example, ethylene.

I claim:

1. In the separation of acetylene from a gaseous mixture containing the same wherein a selective solvent is employed to absorb acetylene from said gaseous mixture and there is unavoidably absorbed a small percentage of the other gases which are lower boiling than the acetylene, in said mixture, which are stripped from the solvent following the absorption step by elevating the temperature of the solvent containing the acetylene and said gases substantially at the pressure at which said acetylene and said unavoidably absorbed gases are absorbed, the improvement which comprises adding a third component which is other than any of said acetylene, said gases and said solvent during said temperature elevation effective to reduce the temperature to which the combined mixture need be elevated to strip said other gases from the solvent and the acetylene and to dilute the said acetylene and the said solvent.

2. A method according to claim 1 wherein said solvent is acetone and said third component is pentane.

3. A method for the purification of acetylene which comprises passing a stream containing acetylene and undesirable hydrocarbons such as ethylene and ethane into an absorber zone, therein contacting the acetylene-containing gases with acetone thereby selectively absorbing substantially all of the acetylene and some of the ethylene and ethane to form a mixture of solvent, acetylene, ethylene, and ethane, passing said mixture into contact with an acetone-pentane mixture at a relatively higher temperature in a stripping zone to strip from said mixture said ethylene and ethane, passing the resulting mixture of acetone, acetylene, and pentane to an acetylene separation zone, in said acetylene separation zone separating substantially pure acetylene from said acetone, acetylene, and pentane mixture, passing the resulting mixture of acetone and pentane to an acetone separating zone in which substantially pure acetone is separated, recovered and returned to said absorber zone, then recovering from said acetone separation zone a resulting acetone and pentane mixture which is heated to a desired temperature and passed to said stripping zone.

4. A method according to claim 3 wherein the absorber zone and stripping zone are comprised within a single zone maintained at a temperature at the bottom thereof of approximately 140–170° F. and 60–80° F. at the top thereof, and at a pressure in the range of 40–60 pounds per square inch gauge, the acetylene separation zone, at the top thereof, is maintained at a temperature in the range 70–90° F. and at a pressure in the range atmospheric–15 pounds per square inch gauge, said acetone separation zone is maintained at a temperature, at the bottom thereof of 135–155° F. and at the top thereof of 100–120° F. and at a pressure in the range atmospheric–10 pounds per square inch gauge, and wherein the said gases fed to said absorber zone are at a temperature of 50–90° F.

5. An apparatus suitable for the purification of acetylene contained in a stream of hydrocarbons which comprises in combination an absorber tower, a conduit for introducing said gases into said tower at a mid-point thereof, a conduit for removing undesired gases from the top of said tower, a conduit at the top of said tower for introducing selective solvent thereinto, a conduit at the bottom of said tower, and heating means at the bottom of said tower, for introducing preheated solvent and a diluent-stripper material into the bottom of said tower, a withdrawal conduit at the bottom of said tower for withdrawing from said tower a mixture of selective solvent, acetylene, and said diluent-stripper, said last-mentioned conduit communicating with another tower, said last-mentioned tower having a conduit communicating with the top thereof for removing as overhead substantially pure acetylene product, a partial condenser mounted on said conduit for condensing a portion of said acetylene product, a conduit communicating with said partial condenser for returning some of said condensed acetylene as reflux to said tower, a conduit communicating with the bottom of said last-mentioned tower for withdrawing therefrom a mixture of said solvent and said diluent-stripper, a reboiling means in open communication with said conduit and with a conduit for returning reboiled bottoms to said last-mentioned tower, a conduit in open communication with said reboiler means and a tower for the recovery of solvent and diluent-stripper solvent mixture, a conduit at the top of said last-mentioned tower for recovering a mixture of solvent and diluent, said last-mentioned conduit being in open communication with said heater and said conduit for passing solvent and diluent-stripper medium to the bottom of said absorber tower, a conduit at the bottom of said tower for recovery of said solvent and said diluent-solvent mixture for withdrawing therefrom substantially pure solvent, said conduit being in open communication with a reboiler and a conduit for returning some of said solvent to the tower from which it is withdrawn and with a conduit and a cooler for cooling the remainder of said solvent and passing the same into said absorber.

6. A method for the purification of acetylene which comprises passing a stream containing acetylene and hydrocarbons undesired in said acetylene such as ethylene and ethane into an absorber zone, therein contacting the acetylene-containing gases with acetone thereby selectively absorbing substantially all of the acetylene and some of the ethylene and ethane to form a mixture of solvent, acetylene, ethylene, and ethane, passing an acetone-pentane mixture at a relatively higher temperature than the said mixture into the bottom of said absorber zone to strip therein from said mixture said ethylene and ethane, passing the resulting mixture of acetone, acetylene, and pentane to an acetylene separation zone, in said acetylene separation zone separating substantially pure acetylene from said acetone, acetylene, and pentane mixture, passing the resulting mixture of acetone and pentane to an acetone separating zone in which substantially pure acetone is separated, recovered and returned to said absorber zone, then recovering from said acetone separation zone a resulting acetone and pentane mixture which is heated to a desired temperature and passed to said absorber zone.

7. A method for the purification of acetylene which comprises passing a stream containing acetylene and other hydrocarbons such as ethylene and ethane which are undesired in the acetylene into an absorber zone, therein contacting the acetylene-containing gases with acetone thereby selectively absorbing substantially all of the acetylene and some of the ethylene and ethane to form a mixture of solvent, acetylene, ethylene, and ethane, collecting a body of said mixture in the bottom of said absorber zone, introducing into the bottom of said absorber zone and into said body of mixture a third component effective to reduce the temperature of the mixture which is required to strip therefrom the gases undesired therein, and withdrawing the resulting mixture from said absorber zone.

8. A method according to claim 7 wherein the said third component is pentane.

9. In the separation of acetylene from a gaseous mixture containing the same wherein a selective solvent is employed in an absorption zone to absorb acetylene from said gaseous mixture and there is unavoidably absorbed a small percentage of the other gases which are lower boiling than the acetylene, in said mixture, which are stripped from the solvent following the absorption step but before leaving said zone by elevating the temperature of the solvent containing the acetylene and said gases substantially at the pressure at which said acetylene and said unavoidably unabsorbed gases are absorbed, the improvement which comprises adding a third component which is other than any of said acetylene, said gases and said solvent during said temperature elevation in said zone to reduce the temperature to which the combined mixture need be elevated to strip said other gases from the solvent and the acetylene and to dilute the said acetylene and the said solvent in said zone.

10. A separation according to claim 9 wherein said third component forms an azeotrope in said zone during said temperature elevation.

11. A separation according to claim 1 wherein said third component forms an azeotrope in said zone during said temperature elevation.

12. A separation of acetylene according to claim 1 wherein said third component which is added during said temperature elevation has a boiling point which is intermediate that of the acetylene and the solvent employed.

13. A separation according to claim 12 in which said third component forms an azeotrope during said temperature elevation.

14. A method according to claim 1 wherein said solvent is acetone.

15. A method according to claim 1 wherein said solvent is ethyl acetate.

16. A method according to claim 1 wherein said solvent is ethyl acetate and said third component is hexane.

17. In the separation of acetylene from a gaseous mixture containing the same wherein a selective solvent is employed to absorb said acetylene from said gaseous mixture and there is unavoidably absorbed a small percentage of the other gases which are lower boiling than said acetylene, in said mixture, which are stripped from the solvent following the absorption step by elevating the temperature of the solvent containing said acetylene and said other gases substantially at the pressure at which said acetylene and said unavoidably absorbed gases are absorbed, the improvement which comprises adding a third component, which is other than any of said acetylene, said gases and said solvent, during said temperature elevation effective to reduce the temperature to which the combined mixture need be elevated to strip said other gases from the solvent and said acetylene and to dilute the said acetylene and the said solvent.

References Cited in the file of this patent

UNITED STATES PATENTS

| | | |
|---|---|---|
| 2,405,693 | Hamill et al. | Aug. 13, 1946 |
| 2,522,059 | Ray et al. | Sept. 12, 1950 |
| 2,587,689 | Box | Mar. 4, 1952 |
| 2,659,453 | Robinson | Nov. 17, 1953 |
| 2,661,812 | Gilmore | Dec. 8, 1953 |
| 2,670,810 | Dorsey | Mar. 2, 1954 |
| 2,715,947 | Alexander | Aug. 23, 1955 |